(12) United States Patent
Kumar et al.

(10) Patent No.: US 11,574,019 B2
(45) Date of Patent: Feb. 7, 2023

(54) PREDICTION INTEGRATION FOR DATA MANAGEMENT PLATFORMS

(71) Applicant: BUSINESS OBJECTS SOFTWARE LTD., Dublin (IE)

(72) Inventors: Apoorva Kumar, Dublin (IE); Alan McShane, Baldolye (IE)

(73) Assignee: Business Objects Software Ltd., Dublin (IE)

( * ) Notice: Subject to any disclaimer, the term of this patent is extended or adjusted under 35 U.S.C. 154(b) by 594 days.

(21) Appl. No.: 16/134,043

(22) Filed: Sep. 18, 2018

(65) Prior Publication Data
US 2020/0004891 A1 Jan. 2, 2020

Related U.S. Application Data

(60) Provisional application No. 62/691,236, filed on Jun. 28, 2018.

(51) Int. Cl.
*G06F 16/9038* (2019.01)
*G06F 3/0486* (2013.01)
*G06F 16/25* (2019.01)
*G06N 20/00* (2019.01)

(52) U.S. Cl.
CPC ........ *G06F 16/9038* (2019.01); *G06F 3/0486* (2013.01); *G06F 16/254* (2019.01); *G06N 20/00* (2019.01)

(58) Field of Classification Search
CPC .. G06F 16/254; G06F 16/9038; G06F 3/0481; G06F 3/0486; G06N 20/00; G06N 3/08; G06Q 10/0633
See application file for complete search history.

(56) References Cited

U.S. PATENT DOCUMENTS

| | | | | |
|---|---|---|---|---|
| 9,021,443 B1* | 4/2015 | Lachwani | ........... | G06F 11/3664 717/127 |
| 10,262,271 B1* | 4/2019 | Doddi | .................... | G06F 3/0484 |
| 10,366,053 B1* | 7/2019 | Zheng | .................... | G06N 20/00 |
| 2010/0153444 A1 | 6/2010 | Nayak et al. | | |
| 2012/0191630 A1* | 7/2012 | Breckenridge | ........ | G06N 20/00 706/12 |

(Continued)

OTHER PUBLICATIONS

U.S. Appl. No. 15/881,090, Bhatia et al., filed Jan. 26, 2018.

*Primary Examiner* — Jennifer N Welch
*Assistant Examiner* — Ashley M Fortino
(74) *Attorney, Agent, or Firm* — Fish & Richardson P.C.

(57) ABSTRACT

Techniques are described for integrating prediction capabilities from data management platforms into applications. Implementations employ a data science platform (DSP) that operates in conjunction with a data management solution (e.g., a data hub). The DSP can be used to orchestrate data pipelines using various machine learning (ML) algorithms and/or data preparation functions. The data hub can also provide various orchestration and data pipelining capabilities to receive and handle data from various types of data sources, such as databases, data warehouses, other data storage solutions, internet-of-things (IoT) platforms, social networks, and/or other data sources. In some examples, users such as data engineers and/or others may use the implementations described herein to handle the orchestration of data into a data management platform.

18 Claims, 12 Drawing Sheets

(56) References Cited

U.S. PATENT DOCUMENTS

| | | |
|---|---|---|
| 2013/0290223 A1 | 10/2013 | Chapelle et al. |
| 2015/0261846 A1 | 9/2015 | Hall et al. |
| 2015/0302015 A1 | 10/2015 | Saurel et al. |
| 2017/0148264 A1 | 5/2017 | Pichette et al. |
| 2017/0262769 A1 | 9/2017 | McShane et al. |
| 2017/0264670 A1 | 9/2017 | Huu et al. |
| 2018/0103088 A1* | 4/2018 | Blainey .................. H04L 67/10 |
| 2018/0165604 A1* | 6/2018 | Minkin .................. G06N 5/022 |
| 2018/0219888 A1* | 8/2018 | Apostolopoulos .......................... H04L 63/1425 |
| 2018/0336319 A1* | 11/2018 | Itu ........................... G16B 25/00 |
| 2019/0295103 A1* | 9/2019 | Tehranchi ............ G06Q 10/103 |
| 2019/0324893 A1* | 10/2019 | Vaishnav ................ G06N 20/00 |
| 2020/0045131 A1* | 2/2020 | Nigam .................. H04L 67/125 |

\* cited by examiner

PREDICTION INTEGRATION FOR DATA MANAGEMENT PLATFORMS

CROSS-REFERENCE TO RELATED APPLICATIONS

The present disclosure is related to, and claims priority to, U.S. Provisional Patent Application Ser. No. 62/691,236, titled "System For Exporting Predictive Insights Into Business Applications From Data Management Platforms," which was filed on Jun. 28, 2018, the entirety of which is incorporated by reference into the present disclosure. The present disclosure is also related to U.S. patent application Ser. No. 15/881,090, titled "Fault Tolerant Adapter System To Consume Database As A Service," which was filed on Jan. 26, 2018, the entirety of which is incorporated by reference into the present disclosure.

BACKGROUND

Given the ubiquity of computing devices of various types of uses, entities have access to increasing volumes of data of various types, which may be generated in high volume. Such data can be produced by various types of source devices, such as computers, sensors, internet-of-things (IoT) (e.g., smart) devices, industrial control systems, and so forth. The data can be of different types and/or formats, such as process log files, images, videos, location or navigation data, sentiment data from social media, and so forth. Entities seek to mine or otherwise exploit this data to determine patterns, insights, opportunities, and so forth, which can provide a competitive advantage and/or other benefits. However, the quantity and variety of the data in such "big data" environments pose many challenges for data analysis and other data processing.

SUMMARY

Implementations of the present disclosure are generally directed to use of prediction techniques in data management platforms. More particularly, implementations of the present disclosure are directed to integration of prediction algorithms such as machine learning (ML) trained models into other applications and/or solutions within a data management platform.

In general, implementations of innovative aspects of the subject matter described in this specification can be embodied in a method that includes the following operations: presenting, in a user interface (UI), a plurality of UI elements associated with a plurality of operators including at least one machine learning (ML) operator and at least one visualization operator; determining a workflow that describes at least one input data source and an execution order for the at least one ML operator and the at least one visualization operator, wherein the workflow is determined based on: i) a selection of the at least one data source through the UI, ii) a selection of the at least one ML operator and the at least one visualization operator through the UI, and iii) an indication, through the UI, of the execution order for the at least one ML operator and the at least one visualization operator; presenting a visual depiction of the workflow in the UI; and executing the workflow including executing the at least one ML operator and the at least one visualization operator in the execution order against data included in the at least one data source, wherein the workflow generates at least one prediction that is presented according to the at least one visualization operator.

These and other implementations can each optionally include one or more of the following innovative aspects: the at least one data source includes at least two heterogeneous data sources; the at least one data source includes sensor data generated by at least one internet-of-things (IoT) device; the selection of the at least one ML operator and the at least one visualization operator is through a drag-and-drop of the at least one ML operator and the at least one visualization operator from a first section of the UI into a second section of the UI; the plurality of operators further include at least one data preparation operator; the workflow further describes the at least one data preparation operator; the workflow is further determined based on a selection of the at least one data preparation operator through the UI; the execution order further includes the at least one data preparation operator executed prior to the at least one ML operator; the at least one prediction is presented according to the at least one visualization operator in the UI; the at least one prediction is communicated according to the at least one visualization operator for presentation in at least one other UI; the at least one ML operator includes at least one model that generates the at least one prediction based on input data from the at least one input data source; the operations further include generating the classifier, including determining a second workflow that describes the at least one input data source and at least one other ML operator to train the at least one model based on training data from the at least one input data source; and/or the second workflow is specified through the UI.

Implementations described herein can be used to export predictions (e.g., scores), such as via application programming interfaces (APIs) which can be seamlessly integrated with various types of applications. An application developer can use these APIs to import insights in their application, without necessarily requiring the developer to understand the details of machine learning, thereby enabling the developer to readily add intelligence to their application.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to techniques for integrating prediction capabilities from data management platforms into applications (e.g., business applications). Implementations employ a data science platform (DSP) that operates in conjunction with a data management solution (e.g., a data hub), such as the SAP Data Hub™. In some examples, the DSP is targeted toward users who are data scientists or other types of users who are well-versed in machine learning (ML) techniques. The DSP can be used to orchestrate data pipelines using various ML algorithms and/or data preparation functions. The data hub can also provide various orchestration and data pipelining capabilities to receive and handle data from various types of data sources, such as databases (e.g., SAP HANA™), Hadoop™, internet-of-things (IoT) platforms, data warehouses (e.g., SAP BW™), social networks, and so forth. In some examples, users such as data engineers and/or others may use the implementations described herein to handle the orchestration of data into a data management platform.

The DSP can provide data science capabilities to manipulate data within the data hub. For example, such data science capabilities can include powerful, robust predictive models, which can bring predictive capabilities and insights into business applications by exposing data science tools for use in the applications. The predictive insights can also be consumed by enterprise solutions, cloud-based applications, analytics applications, and so forth. In this way, implementations provide techniques and a platform that enables a business application developer and/or user who take advantage of ML-based predictive insights and data analytics tools, and bring such intelligence into their solutions, without requiring the user to have expertise in ML algorithms. Implementations provide a richer experience by integration predictive techniques and insights into applications that execute against data available through the data hub.

For example, an application may be hosted (e.g., as a software-as-a-service (SaaS) offering) in an analytics cloud environment, such as the SAP analytics cloud. A developer of the application may seek to add predictive capabilities to the application, but may not have expertise in ML techniques. Using the DSP and interfaces described herein, such a developer can have access to predictive insights (e.g., scored results) using services (e.g., RESTful and/or OData services) that are directly integrated into the data analytics cloud. Any suitable type of application can be integrated with the DSP. In some implementations, the integration is achieved by using REST/OData endpoints, as described further below. For example, the SAP Analytics cloud may be one such consumer.

Figure 1:
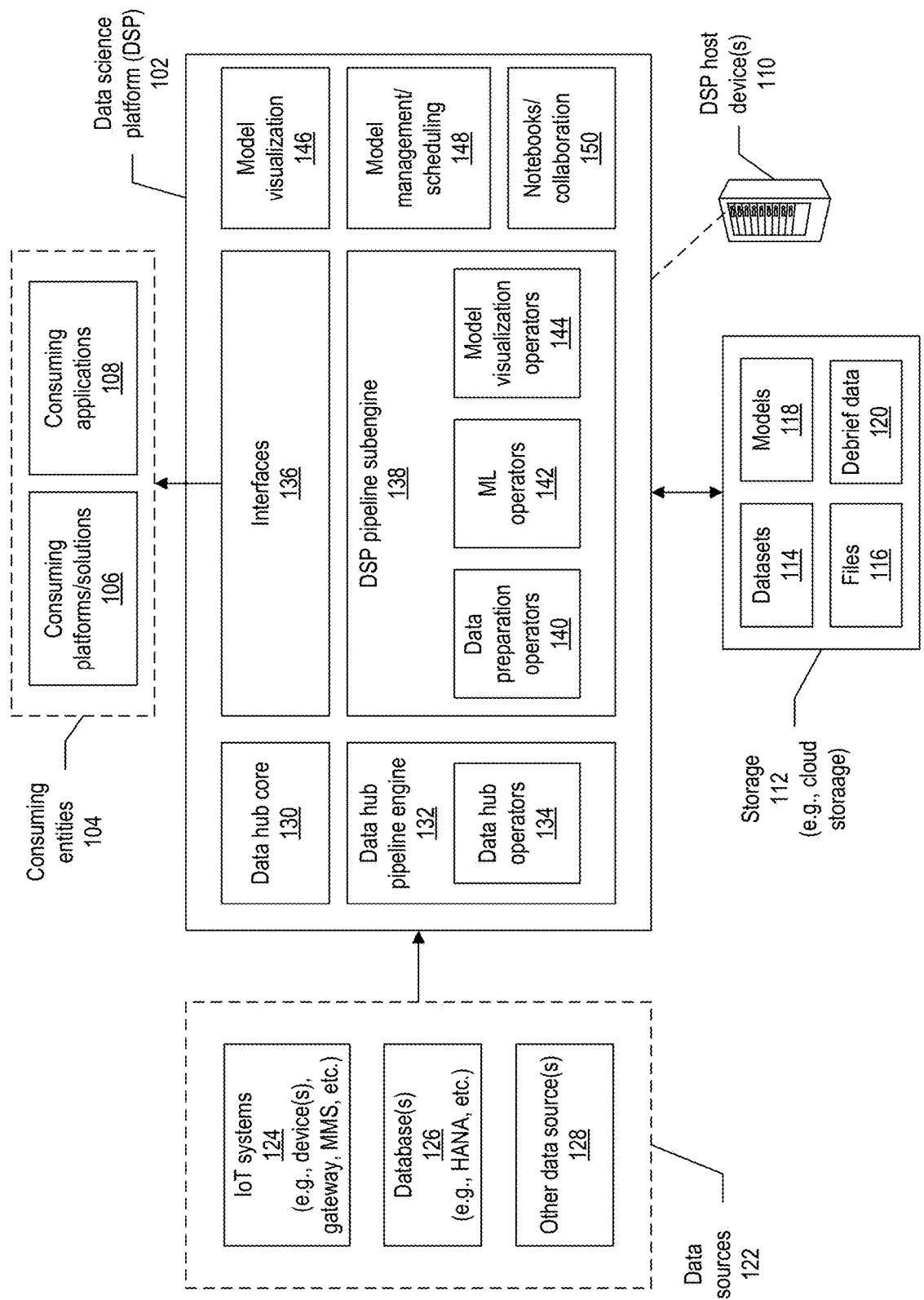
FIGS. 1 and 2 depict example systems, according to implementations of the present disclosure.

FIG. 1 depicts an example system, according to implementations of the present disclosure. As described above, the system can include a DSP 102. The DSP 102 can include, or otherwise operate in conjunction with a data hub that includes a data hub core 130 and a data hub pipeline engine 132. The data hub can also include any suitable number of data hub operators 134 that each enable the data hub to receive data from a type of data source 122. The data sources 122 can include, but are not limited to, IoT systems 124, database(s) 126, and/or other data sources 128 such as social media platforms, data warehouses, and so forth. In some instances, the data source(s) 128 can provide data according to an OpenAPI format.

An IoT system 124 can include any suitable number of IoT devices, such as sensor devices, smart appliances, industrial automation devices, and so forth. An IoT system 124 can also include an IoT gateway that receives data from the IoT devices, and an IoT message management service (MMS) and/or Message Broker (e.g., Kafka) that communicates the data from the gateway to the data hub operator configured to receive IoT data. The data sources 122 can collectively be described as one or more data lakes.

The DSP 102 can include a DSP pipeline subengine 138 that applies various operators to data provided by the data hub. Such operators can include, but are not limited to, data preparation operators 140, ML operators 142, and model visualization operators 144. Visualization operators can also be described as debrief operators. The subengine 138 can support and/or be built upon various technologies, including Hadoop distributed file system (HDFS)™, Jupyter™, Apache Spark™, SAP HANA™, and so forth.

The DSP 102 can include one or more interfaces 136, which can include user interfaces (UIs), application programming interfaces (APIs), and/or other types of interfaces. In some implementations, the interface(s) 136 include REST interface(s) that are accessed via REST calls. The interface(s) 136 can employ an OData format.

The interfaces 136 enable consuming entities 104 to access predictive insights (e.g., predictions) generated through ML operator(s) 142 applied by the subengine 138 to data from the data hub. Consuming entities 104 can include consuming applications 108, such as business applications of any suitable type, including for example applications for predictive maintenance, fraud detection, brand sentiment determination, product recommendations, personalized care, and so forth. Consuming entities 104 can also include other platforms and/or solutions such as enterprise solutions, cloud-based computing platforms, and so forth, such as the SAP Cloud Platform™, SAP S/4HANA™, Hybris™, the SAP Analytics Cloud™, and so forth.

The DSP 102 can also include modules for model visualization (e.g., debrief) 146, model management and scheduling 148, and/or notebooks and collaboration 150. The model visualization module 146 can provide a UI that allows users of the DSP 102 to integrate ML-based insights and/or predictive techniques into applications 108, as described below.

The DSP 102 can run on DSP host device(s) 110, which can include any suitable number and type of computing device(s). In some examples, the host device(s) 110 can provide a scalable and distributed compute/runtime capabilities, through use of various technologies such as Kubernetes™, Cloud Platform, Big Data Services, Hadoop™, and so forth. The host device(s) 110 can also provide a development sandbox.

In some implementations, the DSP 102 accesses storage 112, such as cloud storage. The storage 112 may be external to the DSP 102 and/or provided on the same host device(s) 110 that provide the DSP 102. The storage 112 can be used to store datasets 114, files 116, models 118, debrief (e.g., visualization) data 120, and/or other information used by the DSP 102.

The DSP 102 provides a mechanism that enables convenient integration of predictive capabilities into applications as well as convenient consumption of the predictive results of such capabilities. A destination for retrieving the results can be configured through the DSP, for example a destination in the SAP Analytics Cloud™ The destination can be provided as a connection to an OData service, or other types of destinations such as SAP S/4HANA™ systems, SAP BW™ systems, and so forth. A user can configure the destination and select a (e.g., OData) service option to use. The user can provide the destination as a URL that has been exposed by DSP 102, where a consuming entity can access the output data in the form of predictive results generated by the DSP 102.

The DSP 102 consumes data from the data sources 122. In some examples, heterogeneous data sources can be combined using the native data hub functionality. Feature engineering data preparation operations from the model training phase can also be used. For example, master data and/or other enterprise data can be brought together with streaming data from IoT sensors (e.g., on a shop floor). Examples of data hub operators to achieve this can include Kafka™ (e.g., to help cross technology boundaries) and the data hub Open API REST client. The data hub SAP HANA™ client can also be used for HANA™ data sources. Some implementations enable a user to leverage SAP Agile Data Preparation™ to handle more complex data preparation transformations. Additional custom transformations can be achieved using native Data Hub Python and JavaScript operators.

In some implementations, the data hub pipeline engine 132 delegates execution of Spark MLLib, HANA PAL/APL, and/or other operators to the DSP pipeline subengine 138. The DSP pipeline subengine 138 can orchestrate the generation of predictive results (e.g., scoring) using a custom Spark™ pipeline execution framework against previously trained models. The model scoring can happen close to the data and/or against the same distributed compute/runtime as the model training/retraining phase. For example, generation of predictive results (e.g., scoring) can be performed natively in a local Kubernetes cluster (using Spark local mode). Alternative runtimes for production setups can include cloud platforms (e.g., GCP, AWS, Azure, Cloudera, Hortonworks, Databricks) on-premise Hadoop, and so forth. Consumption by the consuming entities 104 (e.g., in the application or enterprise platform) can be achieved via Open API REST endpoints and/or the OData Service adapter layer in DSP interfaces 136.

Figure 2:
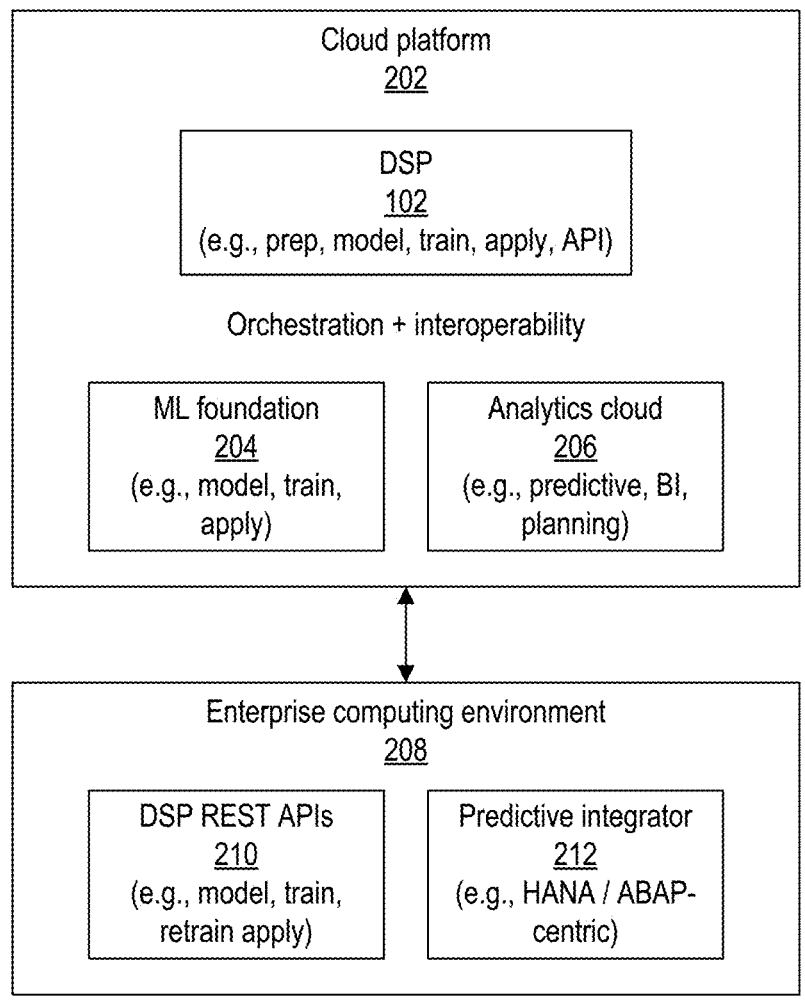

FIG. 2 depicts an example system, according to implementations of the present disclosure. The example of FIG. 2 provides a somewhat higher-level view of the system compared to the example of FIG. 1. In this example, the DSP 102 resides within a broader cloud platform 202. The DSP 102 can provide support for data preparation, model use, model training, model application, and/or API access. Through orchestration and interoperability, the DSP 102 leverages an ML foundation 204 (e.g., providing model, training, and application) and an analytics cloud 206 (e.g., providing predictions, business intelligence, planning).

The cloud platform 202 can interact with an enterprising computing environment 208 that can employ technologies such as SAP S/4HANA™, Hybris™ and/or other suitable technologies. The environment 208 can access DSP REST APIs 210 and a predictive integration 212.

FIG. 2 depicts an example landscape in which the DSP 102 can orchestrate and have interoperability with both an (e.g., SAP) analytics cloud and an ML foundation (e.g., for deep learning). Additional capabilities provided can include data preparation and exposing the ML models (e.g., for scoring and/or retraining) via OData and/or OpenAPI REST endpoints.

In today's world a large variety and volume of data is generated at a high velocity. This so-called "big data" can originate from various sources like machine sensors, IoT "smart" devices, log files, images, videos, GPS readings, sentiment data from social media, and so forth. Mining this data can reveal new business insights and open up new opportunities to keep a business competitive. However, organizations face many challenges to process the data effectively and determine business meaning using traditional, previously available ML-based software solutions.

For example, Apache Hadoop™ offers a highly reliable, scalable, distributed processing platform for this kind of large dataset handling, and provides a cost-effective way of storing and processing this data. One approach to analyse the data is to create custom ML solutions, for example using Apache Spark™. However, one major drawback with this approach is that it requires both Big Data/Spark expertise and a Data Scientist skillset, both highly sought-after skills which are rarely found together in the same people. Adopters have traditionally taken the approach of developing custom scripts and/or custom programming code for their data analytics processing. This has introduced further challenges to create and maintain specific scripts/code for each business model and dataset. The custom solution approach bypasses years of ML software development best practises and does not form a complete end-to-end solution that can provide real benefits for the use of the predictive models in business processes and applications.

In the implementations described herein, the (e.g., SAP) data hub is a data sharing, pipelining, and orchestration solution that helps accelerate and expand the flow of data across diverse data landscapes. The software solution leverages a distributed computing platform to enable an enterprise data lake, e.g., a view of all the company data encompassing structured enterprise master data with diverse and unstructured big data. It also provides support for a large variety of data systems such as Hadoop, SAP HANA, SLT, and so forth, which can be used for the creation of organization-spanning data processing pipelines. A data hub may be extensible by design.

The DSP is a component that sits on top of the data hub and provides ML capabilities inside the data hub pipeline authoring environment. It enables users such as data scientists to create powerful and complex predictive models leveraging the data management capabilities of the data hub, bringing together data from enterprise data systems such as HANA and big data from sensors, social media, and so forth. The DSP provides a suite of predictive algorithm operators, such as those from Apache Spark MLlib to HANA PAL and APL. Existing integration with a ML foundation additionally enables deep learning and/or other ML capabilities such as image classification using Tensorflow. The DSP provides a capability to train models through the pipelines and the resultant predictive models can then be applied on new datasets to generate predictions (e.g., scores) and other useful insights. The quality of the insights can transform a business and/or create new business models, for example through improved fraud detection, checking for GDPR compliance, and/or improved customer experience through more tailored recommendations.

In some implementations, a suitable adapter system can be employed to expose an (e.g., OData/REST) endpoint as described herein to enable the consumption of insights into applications. The adapter system may be a fault tolerant adapter system. Some implementations employ the fault tolerant adapter system that is described in U.S. patent application Ser. No. 15/881,090, titled "Fault Tolerant Adapter System To Consume Database As A Service," which was filed on Jan. 26, 2018, the entirety of which is incorporated by reference into the present disclosure.

Figure 3:
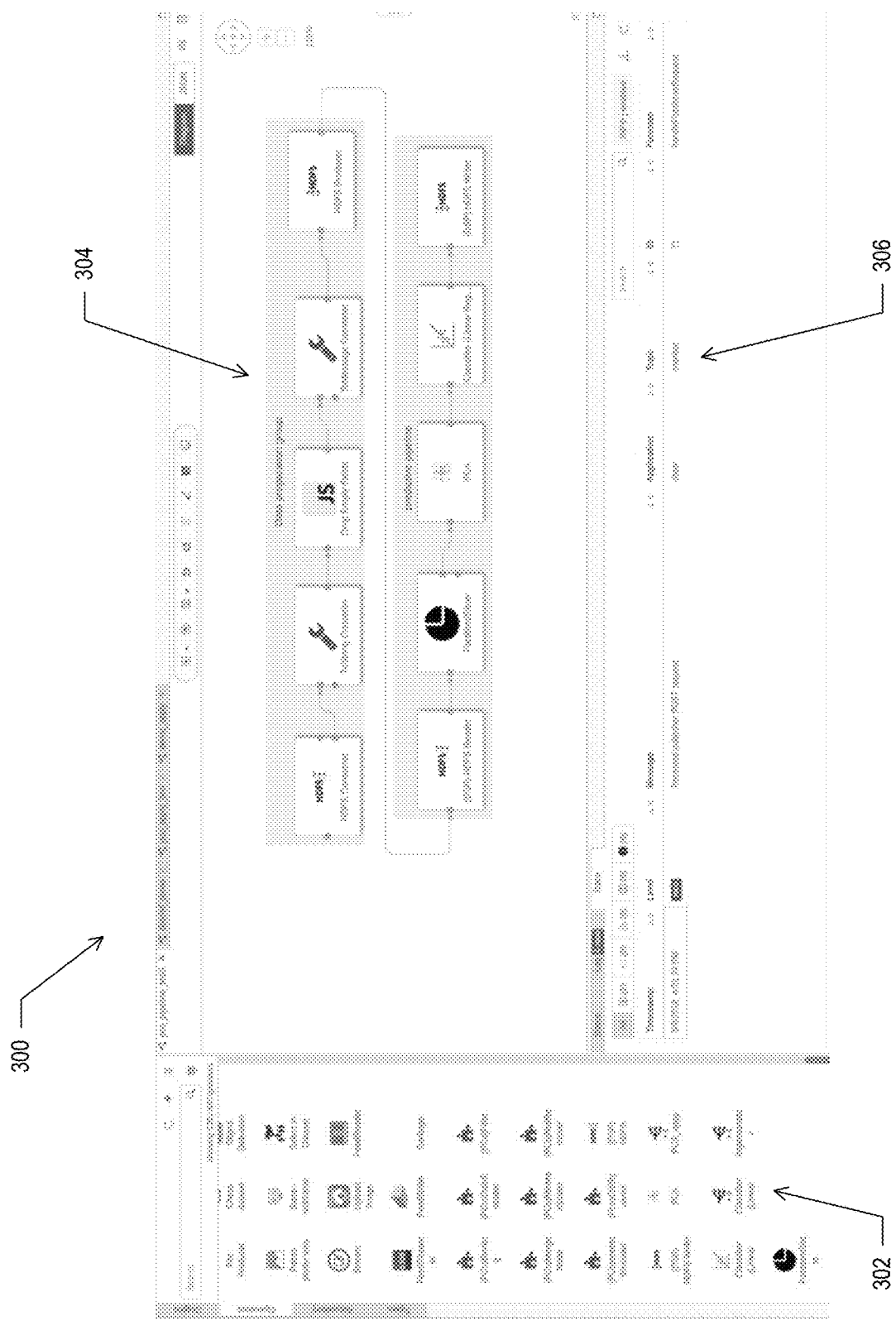
FIGS. 3-8 depict example user interfaces, according to implementations of the present disclosure.

FIG. 3 depicts an example UI 300, according to implementations of the present disclosure. The UI can be provided by the visualization module 146 as described above, such as a data hub pipeline modeler interface. The UI can include a section 302 that shows UI elements (e.g., icons) that each correspond to an operator that can be added to a workflow. The UI can include a section 304 that is usable to compose a workflow, e.g., by dragging and dropping operators from the section 302 into the section 304, and connecting the operators to indicate an execution order for the operators within the workflow. Using this interface, a user can compose a workflow by combining the various available operators in any suitable order, for execution serially and/or in parallel as desired. The UI can include a section 306 that shows status information, log events, trace data for the workflow execution, and/or other information related to the workflow. In the example shown, the user has composed a workflow that includes five data preparation operators (e.g., ToString converter, ToMessage converter, etc.) followed by five predictive pipeline operators (e.g., partition/slicer, classifier, etc.).

Figure 4:
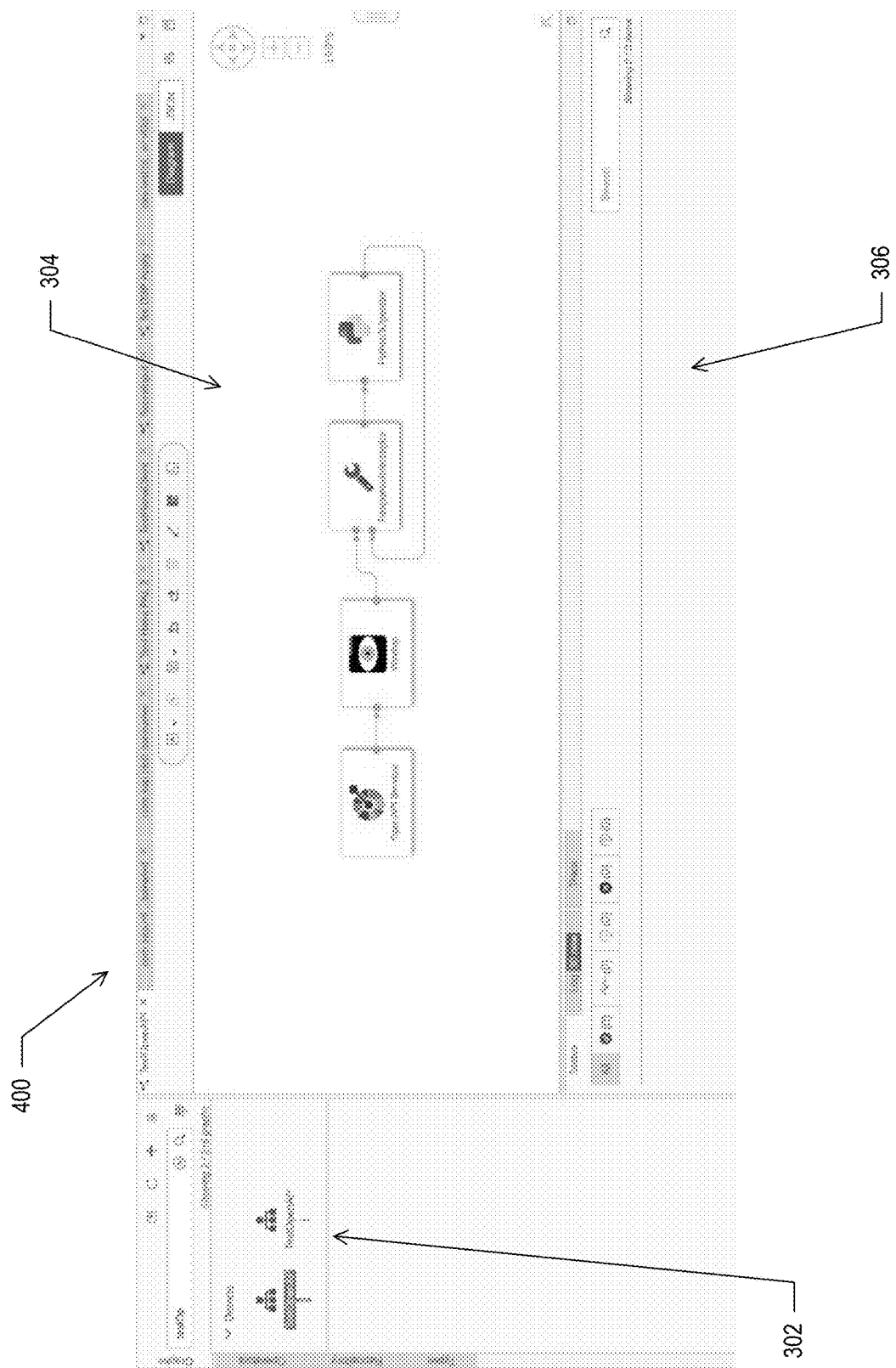

FIG. 4 depicts another example UI 400, according to implementations of the present disclosure. The UI can be provided by the visualization module 146 as described above, such as a data hub pipeline modeler interface. In this example, OpenAPI operators are being used to expose a REST endpoint in the data hub, for retrieving predictive results.

In these examples of FIGS. 3 and 4, operators can be selected from the left-hand pane and dragged/dropped into the right-hand pane to add them to the workflow. The data science operators can be provided using the same skin and format as other data hub operators. The various types of operators can be combined to create a workflow for prediction generation. Predictive models can be built using data from any type data source and/or multiple data sources of different types (e.g., sensor data, social media data, etc.). The models generated can be applied to make predictions based on pipelines of data from the data source(s).

To create a new model, a user can select data source(s) to input to the model generation workflow, and string together any number of suitable operators to generate the model based on the input (e.g., training) data from the selected data source(s). The trained model can then be stored and used in subsequent prediction workflows. The generation workflow can also be used to retrain the model based on new data as appropriate.

The UI can also be used to provide a destination (e.g., URL) where the prediction(s) (e.g., score results) can be retrieved. The destination can be provided as a service in the platform, such as a service URL that provides a connection to the SAP Analytics Cloud where results can be accessed (e.g., through cloud consumption screens). As used herein, scored results refer to predictions generated through the platform.

Figure 5:
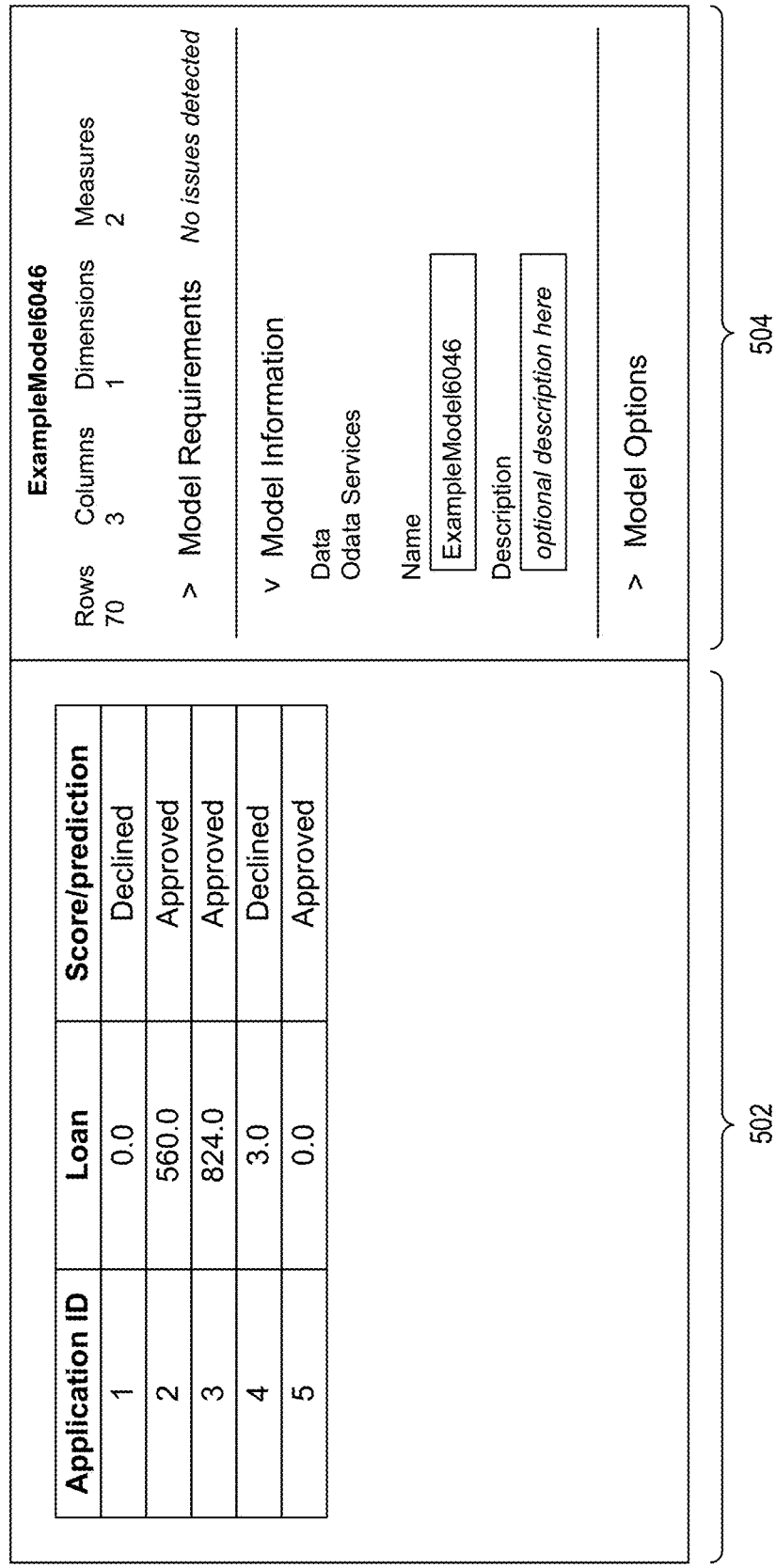

FIG. 5 depicts an example UI 500 of a results consumption screen, according to implementations of the present disclosure. In a first section 502, the UI can display results of a prediction workflow. In this example, the UI is presenting example predictions for approval/disapproval of a loan based on input data, including a loan application ID, a loan amount, and a predicted outcome. The results can be generated through a prediction workflow and consumed from a destination URL as described above. In the section 504, a user can build a query using a query builder tool, selecting columns from the section 502 to build the query. In some examples, a business application user can be provided a destination endpoint (e.g., URL) to retrieve the predictions, and may not be authorized to access the query functionality.

Retrieval of results can be through a GET call to the endpoint destination. In some examples, an application can make a POST call to post input data to the endpoint, and the platform can use the input data for prediction generation. The application can then retrieve the scoring/prediction results from the same endpoint. In other words, a POST operation can be performed to post data to be scored, then a GET call can be made to get the scores. In some examples, the results can be retrieved by composing a query as shown in the example of FIG. 5.

Models can be built by a data scientist user using the platform, using any type of data to train or otherwise create the model. The model can then be consumed by a business application user, consuming prediction results through platform. Implementations can leverage a combination of disparate data sources to train models and/or generate predictions, such as data from a big data environment.

Implementations described herein provide a system for exporting predictive insights, generated using the DSP on Data Management Systems such as the SAP Data Hub, into business applications with the goal of driving business decisions using data driven techniques, thereby making the enterprise business applications more intelligent. Using this system, a business application user/developer can send business data into the data hub and harness the power of predictive models built with big data using the DSP to generate predictive insights. The user can also consume these insights directly into a business application, in the form of a REST/OData service to drive business decisions.

Implementations provide a solution that can be easily integrated into applications and/or other consuming entities such as the SAP Analytics Cloud™, SAP Hybris C4C™, SAP Predictive Maintenance and Service™, Fiori™, and so forth. The predictive models that it leverages can be highly complex and powerful (for example, transformations in Python, machine learning using Spark MLlib, R and HANA PAL/APL and deep learning leveraging Machine Learning Foundation). This solution can take in data from any (e.g., SAP and/or non-SAP) data source, including support for streaming data and data with high velocity and volume, and can be extended to support an even larger variety of ML algorithms than provide in the examples herein. It can be a useful solution for Data Scientists and/or application Developers/Analysts who want to analyze their data and integrate machine learning in their applications to help enable a more intelligent Enterprise.

Implementations provide the following advantages:

Can be used for on-premise and cloud native applications hosted on both Neo@SCP and CF@SCP.

Support a variety of SAP/non-SAP datasources including Apache Hadoop, Hive etc. For example, this support is for using data residing in these systems as datasets to build models.

Much powerful and robust predictive models using Python, SparkMLlib, R and HANA (PAL/APL).

Suitable for any kind of structured/un-structured data.

The system can be used in Fiori-based business applications like Credit card applications, etc. In those applications:

A user can send business data (e.g., bank customer details) to the data science platform as a POST payload using REST/OData endpoint. This data can also be send as batch request.

The user can get the scored results (e.g., credit score approval/decline) on the data he sent as a GET request using REST/OData endpoint.

Other potential systems where the system can be used include SAP Analytics Cloud Consumption, SAP Hybris C4C Consumption, SAP Predictive Maintenance and Service Consumption, and other suitable SAP and non-SAP systems.

The system can be further extended to support building of predictive models. ((re)train operation).

The system can be extended to support higher versions of OData e.g. OData V4 (http://docs.oasis-open.org/odata/odata/v4.0/). OData V4 has more advanced features as compared to V2 which allow more options at the application layer.

System can be extended for support of Jupyter notebook and Data Robots, for interactive predictions.

Table 1 below lists further advantages over previously available solutions.

TABLE 1

Supported on-premise, Neo@SCP and CF@SCP
Supports Hadoop, HANA, SLT, any SAP/non-SAP datasource, e.g., for use as a training dataset.
Offered directly Data Science Platform
Suitable for any kind of data (+ Big Data) including structured, unstructured, IoT, social media data.more powerful models
Machine Learning: much wider ML capabilities including Python, R, Spark MLlib, HANA PAL/APL
Jupyter Notebook extensibility provided
Caters to data management solutions like SAP Data Hub The system can be used in various user centric and process centric scenarios on cloud and/or on-premise.

Implementations also provide the following advantages as user-centric Examples:

Fiori applications, SAP Hybris C4C, SAP Analytics Cloud, SAP Predictive Maintenance and Service are some cloud and on-premise applications that can be made smarter and intelligent using this system.

Enables embedding of scoring capabilities on a greater variety of data sources (enterprise data lake).

Enables simpler embedding of scoring capabilities using a wider range of machine learning algorithms (Spark MLlib, HANA PAL, APL, Machine Learning Foundation (deep learning), python sci-kit learn, R etc.).

Feature engineering in ML, e.g., building up a wider variety of features, greatly improves model robustness and performance. This is enabled in the Data Scientist Platform leveraging all the data sources and additionally integration with HANA EIM services such as HANA Agile Data Preparation.

Notebook integration (such as Jupyter) enables additional functionality including additional consumption options:

Adding customisable debrief capabilities, for example dashboard web UIs;

Additional powerful options for data manipulations in language of choice;

Enabling "SDK/API" approach to build pipelines and interrogate results;

Exporting/importing DSP pipelines for additional sharing/collaboration and consumption options;

All of the above opens up potential for customer/third-party ecosystem for knowledge sharing (blogs) and marketplace activities (selling custom pre-built scripts for complex operations).

Business application users can also create mash-up of scored data with other customer data in order to drive business decisions.

Fiori/UI5 applications—Various Fiori and UI5 applications can use this system to consume the provisioned services in the format they want. For example, UI5 applications have OData Models which can be configured with OData V2 service created by this system. These applications can fire read and query service calls in order to get scored data based on a filter criteria, ordered by some property in ascending and descending order, data displaying only few properties, count of data, displaying top records and skipping top records. The calls can also be batch calls containing multiple combinations of these read and query calls. Usage of OData Models and this system in the Fiori or UI5 apps avoid the need to have any predictive analytics logic at the application layer.

As a more process-centric example, this system can be used to create components in SAP Cloud Platform Integration Services™ (e.g., using open source libraries such as Apache Camel) to provide integration capabilities between systems. These integration scenarios can be cloud to cloud or cloud to on-premise.

Figure 6:
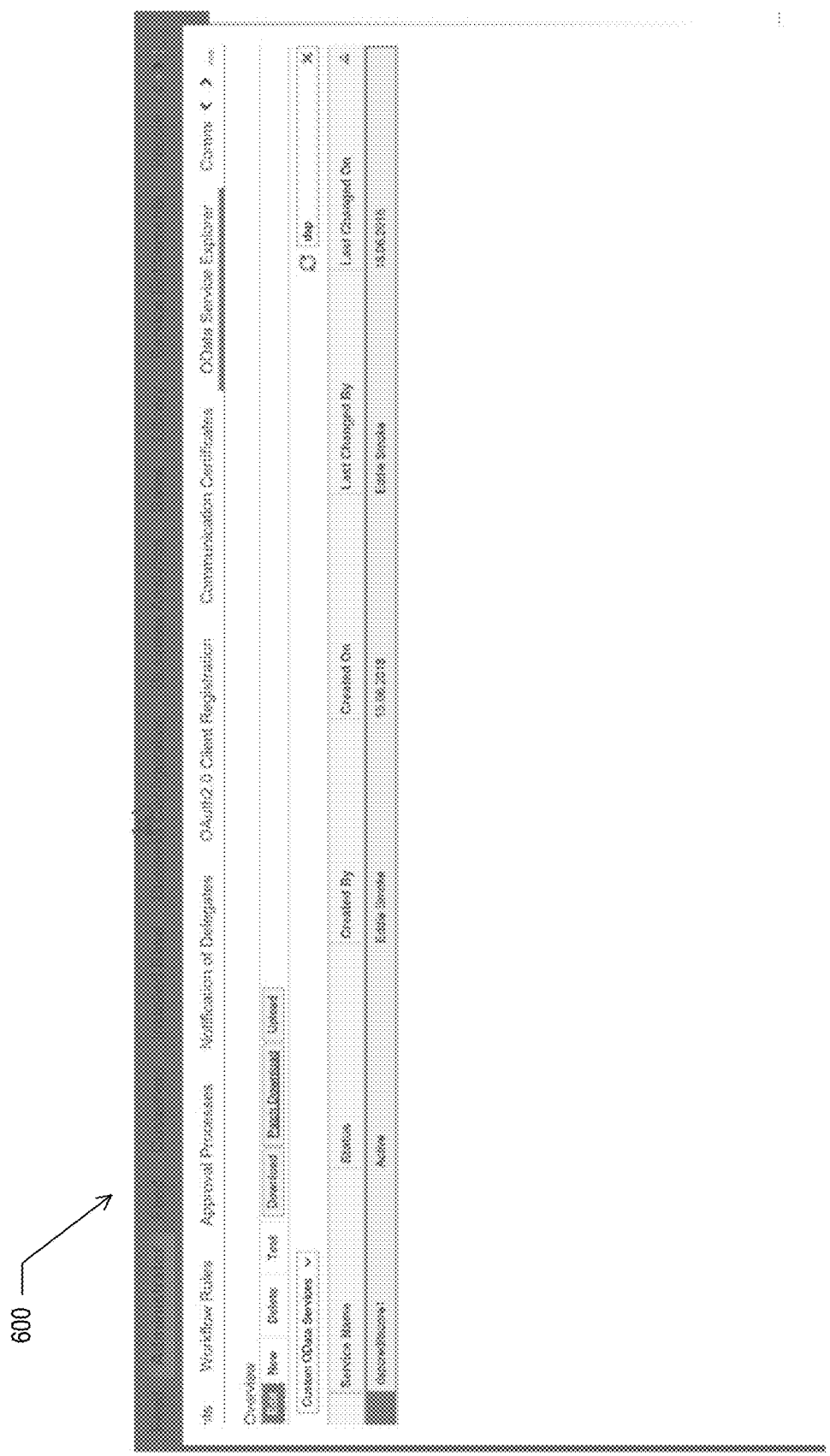

FIG. 6 depicts an example UI 600, according to implementations of the present disclosure. This is an example of an administrator view listing services that are being exposed, such as services to provide predictive results to consuming entities. A service can be listed with a service name, status, and information about the service's creator and/or updates.

Figure 7:
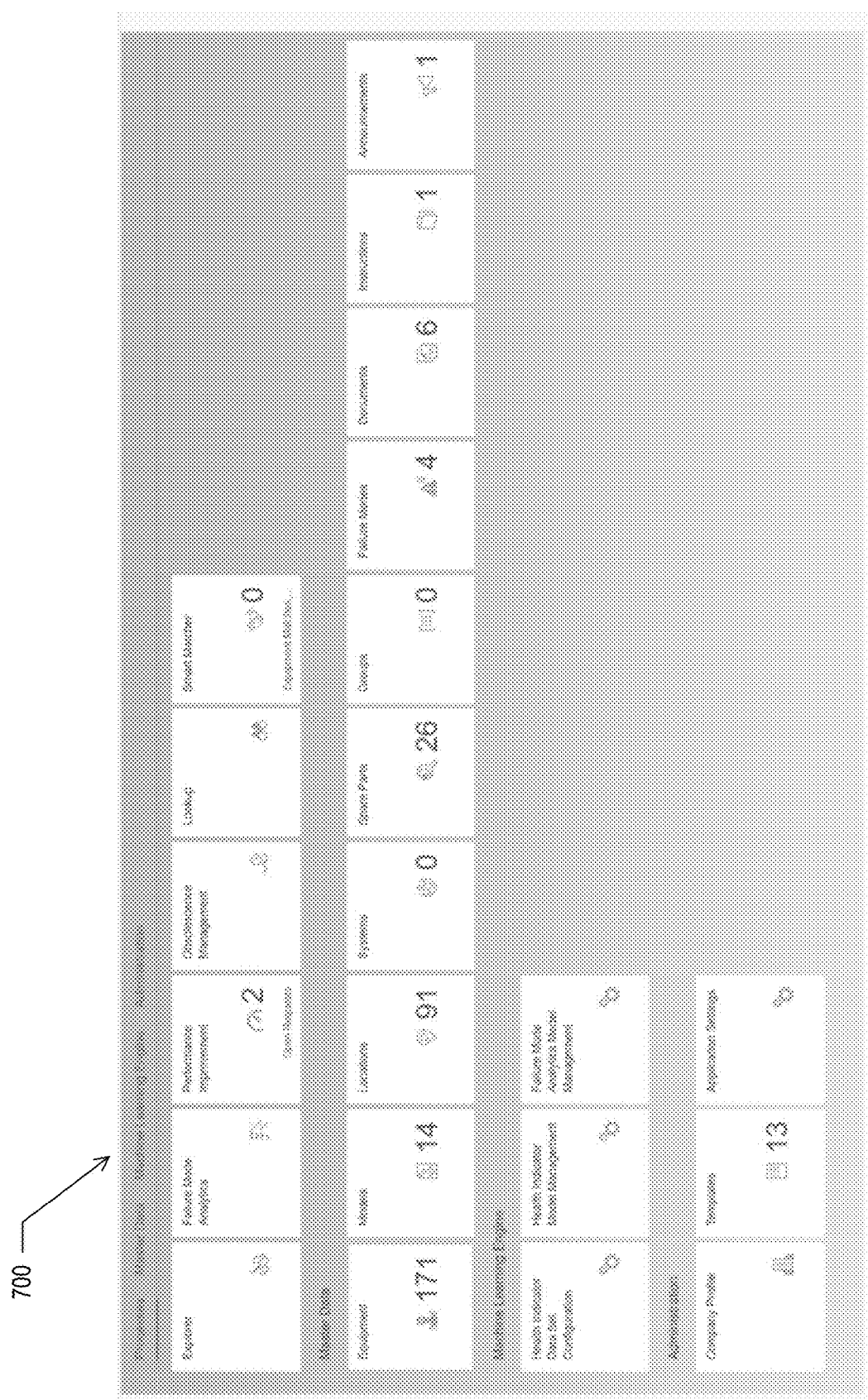

FIG. 7 depicts an example UI 700, according to implementations of the present disclosure. This example UI is showing processes, master data, ML engines, and administration settings available through the platform.

Figure 8:
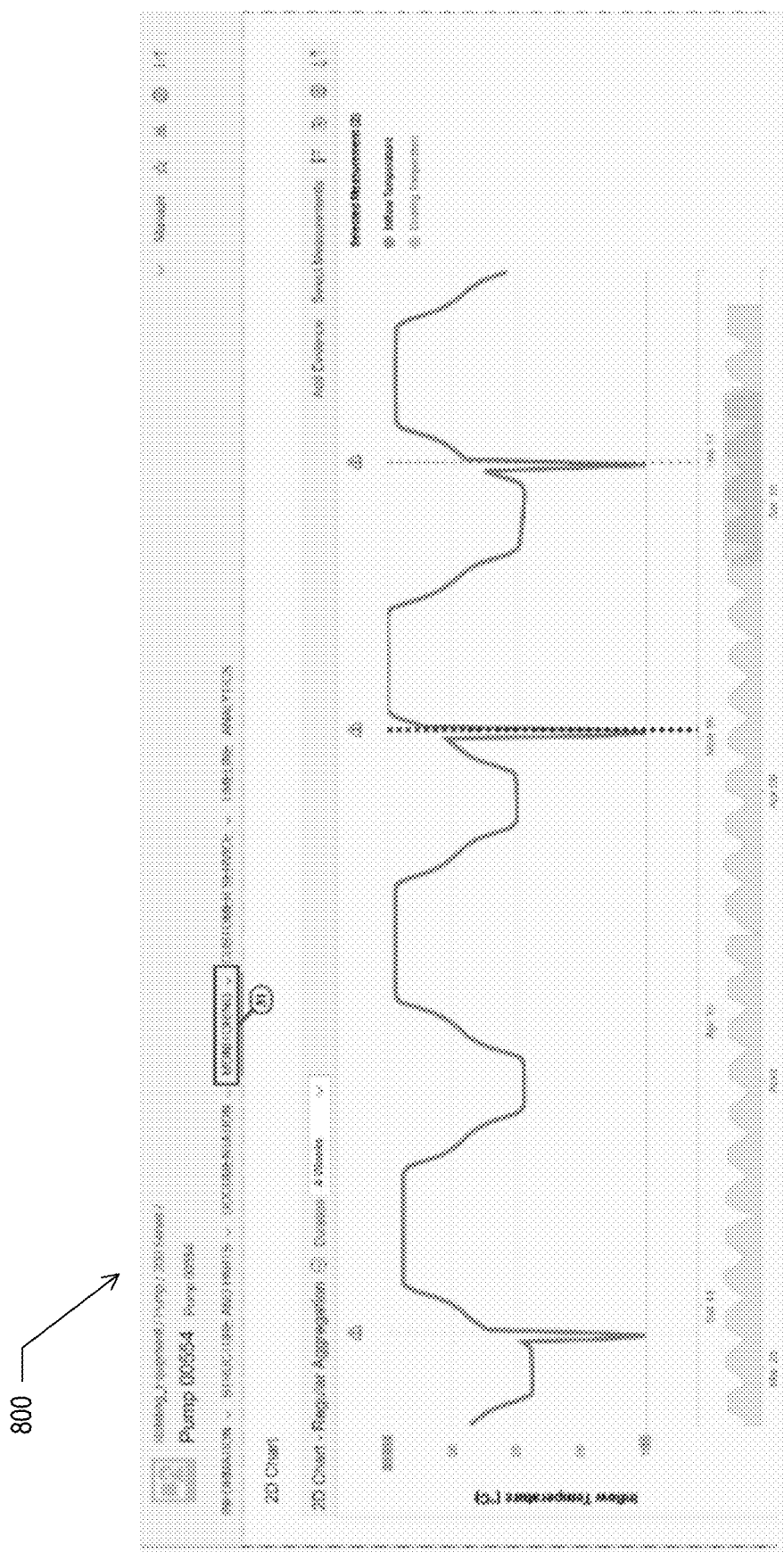

FIG. 8 depicts an example UI 800, according to implementations of the present disclosure. This example UI shows a graphic representation of predictive results that may be provided through the platform.

FIGS. 6-8 show examples of various consumers of this solution which can solve their (e.g., business) problems using the implementations described herein. For example, FIG. 6 shows SAP Hybris C4C™, which can use implementations for finding how many leads can be turned into opportunities. FIGS. 7 and 8 are dashboard screens of SAP Predictive Maintenance and Service™, which can use implementations to predict failures (e.g., in machines, pumps, etc.) thereby reducing maintenance costs. These advantages and others are provided through use of the implementations described herein.

Figure 9:
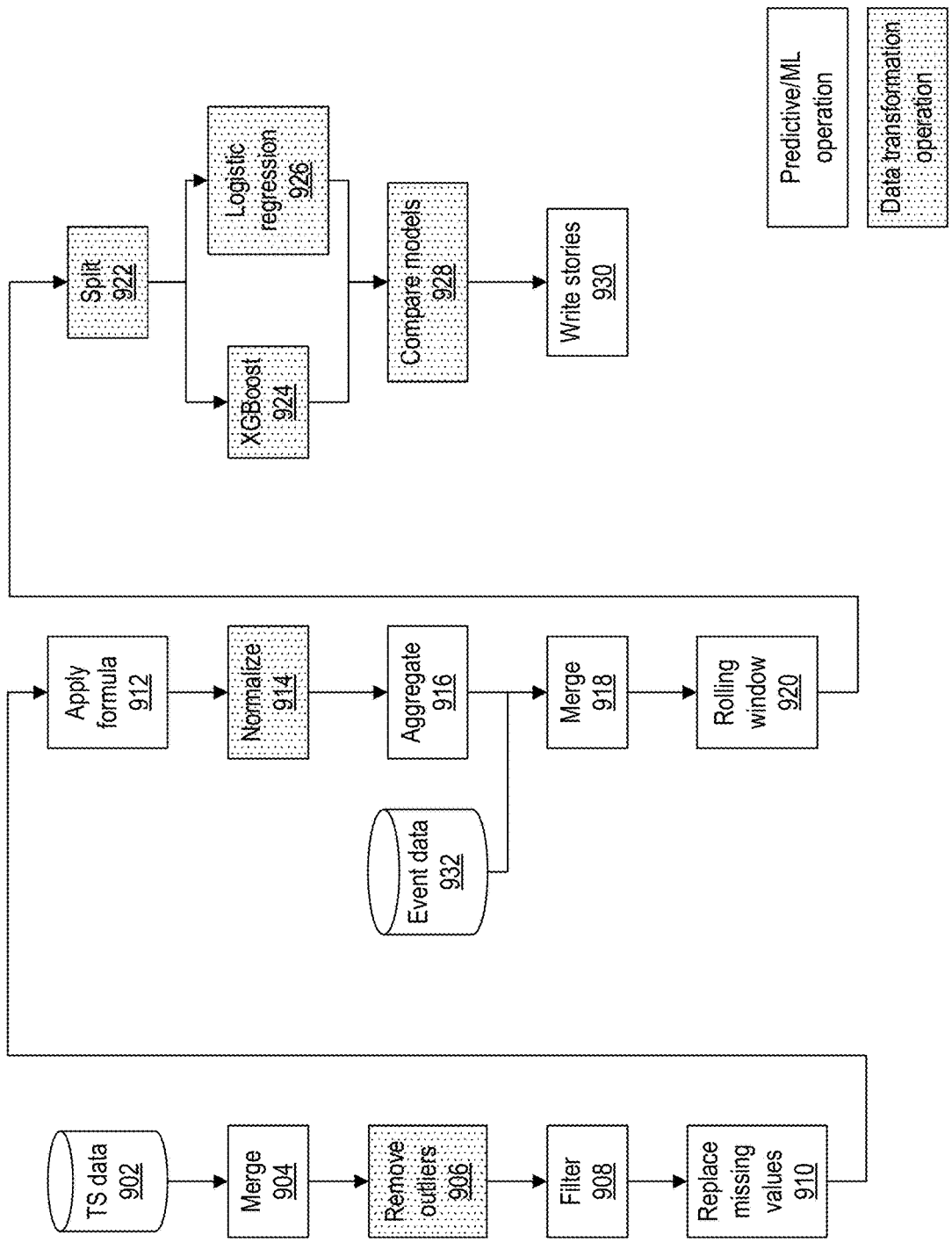
FIGS. 9-11 depict flow diagrams of example processes, according to implementations of the present disclosure.

FIG. 9 depicts a flow diagram of an example process, according to implementations of the present disclosure. This example shows data transformation operators (e.g., shown in cross-hatch fill) and predictive/ML operators (e.g., shown in non-cross-hatch fill), combined in a workflow to generate predictions. In this example, TS data 902 is subjected to operations including: merge 904, remove outliers 906, filter 908, replace missing values 910, apply formula 912, normalize 914, and aggregate 916. The results thus far are merged 918 with event 932 and subjected to operations including: rolling window 920, split 922, XGBoost 924 or logistic regression 926, compare models 928, and write stories 930 to generate the predictive results.

Figure 10:
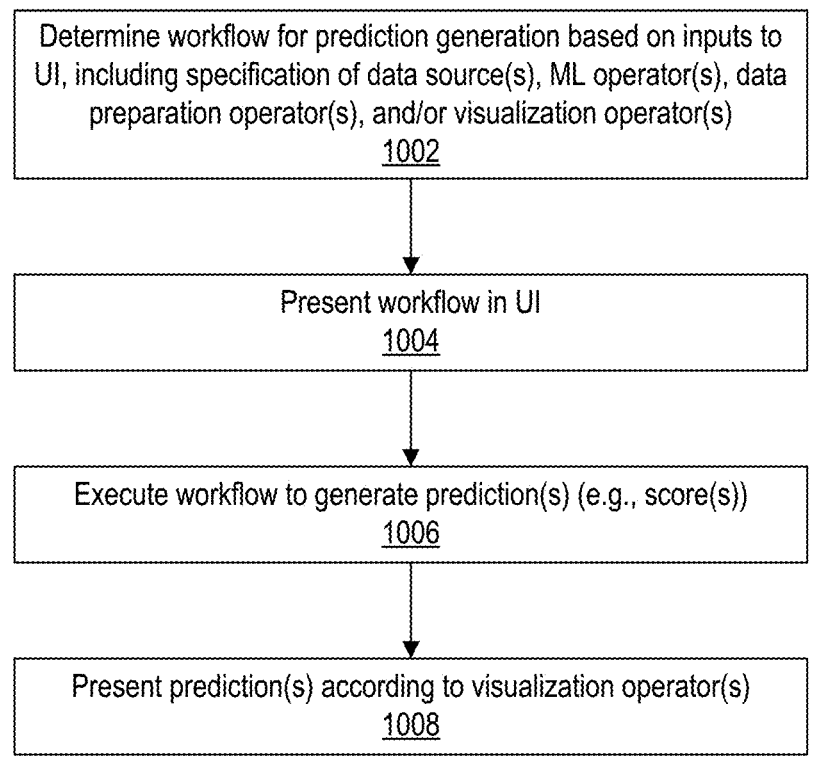

FIG. 10 depicts a flow diagram of an example process for prediction workflow determination and execution, according to implementations of the present disclosure.

A workflow is determined (1002) for prediction generation based on inputs to the UI as described above, including the specification of data source(s), ML operator(s), data preparation operator(s), and/or visualization operator(s) to generate the workflow that executes the operators in the specified order.

The workflow can be presented (1004) in the UI as it is being composed. The workflow can be saved and executed (1006) to generate the predictions. The prediction(s) can be presented (1008) according to the output provided by the visualization (e.g., debrief) operators.

Figure 11:
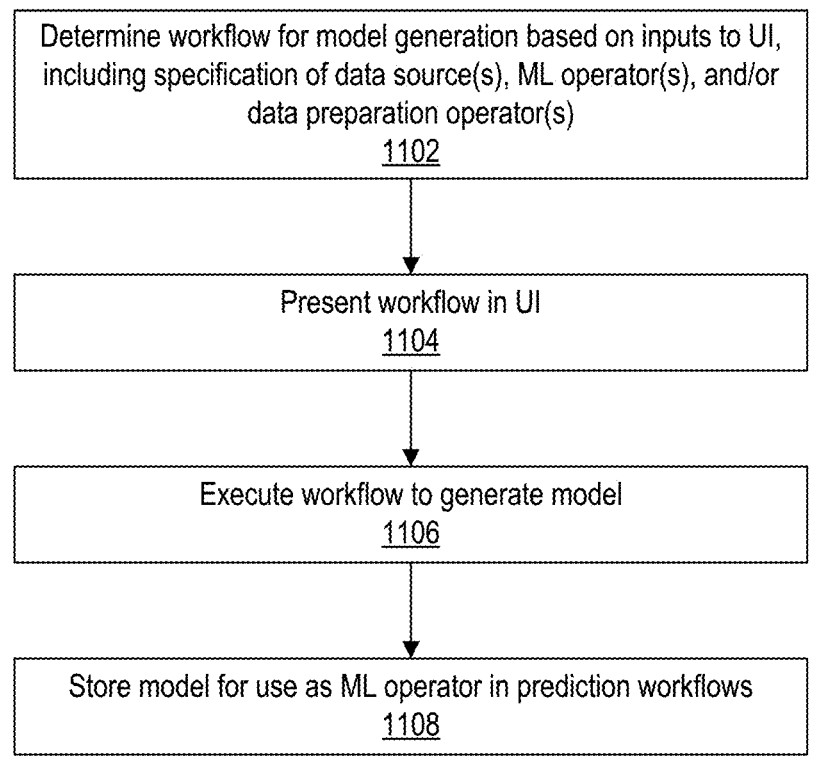

FIG. 11 depicts a flow diagram of an example process for ML operator (e.g., classifier) generation, according to implementations of the present disclosure.

A workflow is determined (1102) for model generation based on inputs to the UI, including specification of data source(s) (e.g., training data), ML operators, and/or data preparation operators.

The workflow can be presented (1104) in the UI as it is being composed. The workflow can be saved and executed (1106) to generate a model, e.g., by using the input training data to train the model using the selected ML algorithm(s). The model can then be stored (1108) and used as an ML operator in prediction workflows. The same model generation workflow can also be used to retrain the model periodically based on newly received input data, as appropriate.

Figure 12:
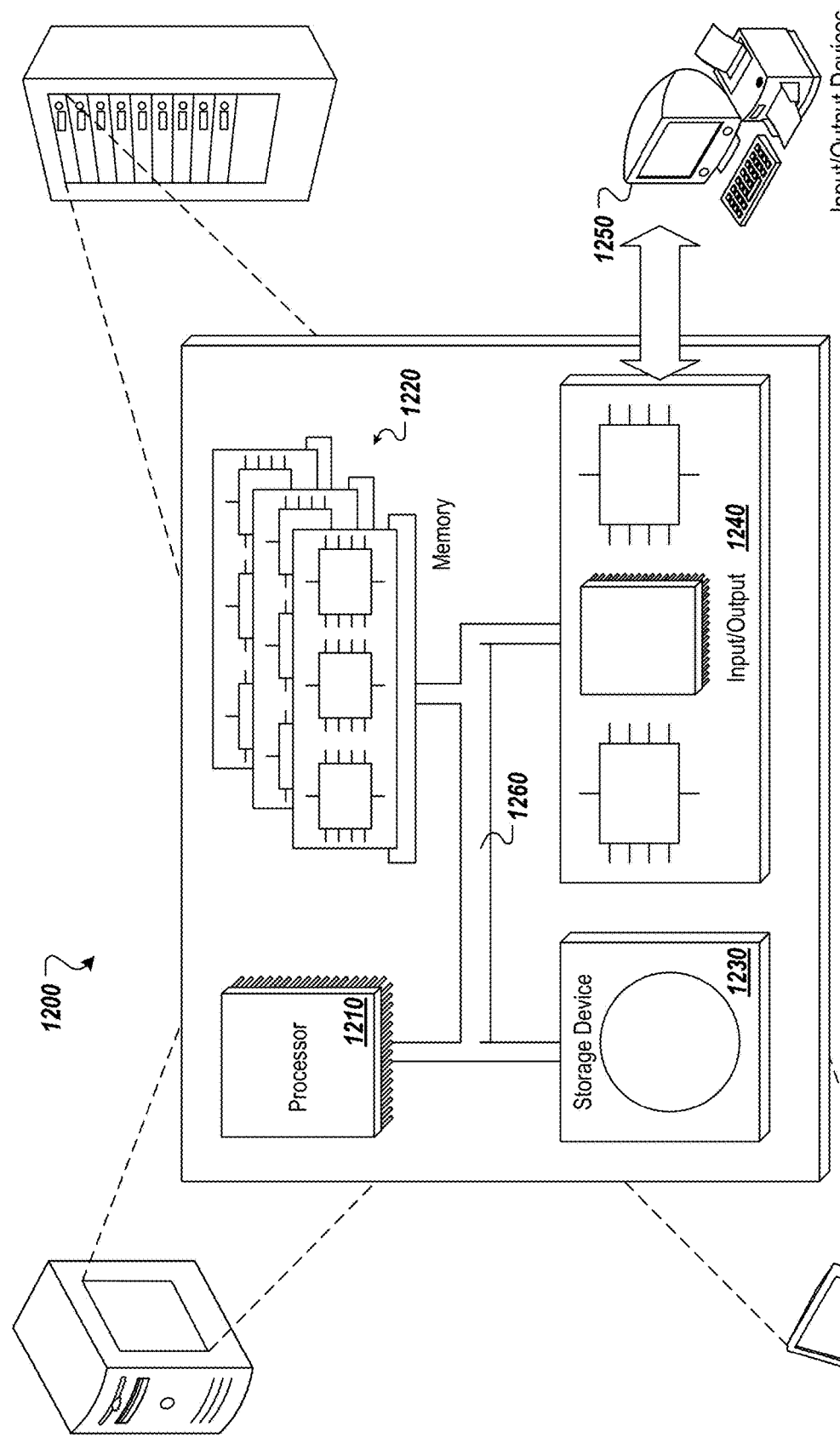
FIG. 12 depicts an example computing system, according to implementations of the present disclosure.

FIG. 12 depicts an example computing system, according to implementations of the present disclosure. The system 1200 may be used for any of the operations described with respect to the various implementations discussed herein. For example, the system 1200 may be included, at least in part, in one or more of the computing device(s) or system(s) described herein. The system 1200 may include one or more processors 1210, a memory 1220, one or more storage devices 1230, and one or more input/output (I/O) devices 1250 controllable via one or more I/O interfaces 1240. The various components 1210, 1220, 1230, 1240, or 1250 may be interconnected via at least one system bus 1260, which may enable the transfer of data between the various modules and components of the system 1200.

The processor(s) 1210 may be configured to process instructions for execution within the system 1200. The processor(s) 1210 may include single-threaded processor(s), multi-threaded processor(s), or both. The processor(s) 1210 may be configured to process instructions stored in the memory 1220 or on the storage device(s) 1230. For example, the processor(s) 1210 may execute instructions for the various software module(s) described herein. The processor(s) 1210 may include hardware-based processor(s) each including one or more cores. The processor(s) 1210 may include general purpose processor(s), special purpose processor(s), or both.

The memory 1220 may store information within the system 1200. In some implementations, the memory 1220 includes one or more computer-readable media. The memory 1220 may include any number of volatile memory units, any number of non-volatile memory units, or both volatile and non-volatile memory units. The memory 1220 may include read-only memory, random access memory, or both. In some examples, the memory 1220 may be employed as active or physical memory by one or more executing software modules.

The storage device(s) 1230 may be configured to provide (e.g., persistent) mass storage for the system 1200. In some implementations, the storage device(s) 1230 may include one or more computer-readable media. For example, the storage device(s) 1230 may include a floppy disk device, a hard disk device, an optical disk device, or a tape device. The storage device(s) 1230 may include read-only memory, random access memory, or both. The storage device(s) 1230 may include one or more of an internal hard drive, an external hard drive, or a removable drive.

One or both of the memory 1220 or the storage device(s) 1230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1200. In some implementations, the CRSM may include a data store that provides storage of computer-readable instructions or other information in a non-transitory format. The CRSM may be incorporated into the system 1200 or may be external with respect to the system 1200. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1210 and the memory 1220 may be supplemented by, or incorporated into, one or more application-specific integrated circuits (ASICs).

The system 1200 may include one or more I/O devices 1250. The I/O device(s) 1250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1250 may also include one or more output devices such as a display, LED(s), an audio output device (e.g., a speaker), a printer, a haptic output device, and so forth. The I/O device(s) 1250 may be physically incorporated in one or more computing devices of the system 1200, or may be external with respect to one or more computing devices of the system 1200.

The system 1200 may include one or more I/O interfaces 1240 to enable components or modules of the system 1200 to control, interface with, or otherwise communicate with the I/O device(s) 1250. The I/O interface(s) 1240 may enable information to be transferred in or out of the system 1200, or between components of the system 1200, through serial communication, parallel communication, or other types of communication. For example, the I/O interface(s) 1240 may comply with a version of the RS-232 standard for serial ports, or with a version of the IEEE 1284 standard for parallel ports. As another example, the I/O interface(s) 1240 may be configured to provide a connection over Universal Serial Bus (USB) or Ethernet. In some examples, the I/O interface(s) 1240 may be configured to provide a serial connection that is compliant with a version of the IEEE 1394 standard.

The I/O interface(s) 1240 may also include one or more network interfaces that enable communications between computing devices in the system 1200, or between the system 1200 and other network-connected computing systems. The network interface(s) may include one or more network interface controllers (NICs) or other types of transceiver devices configured to send and receive communications over one or more communication networks using any network protocol.

Computing devices of the system 1200 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1200 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display)

monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   presenting, in a user interface (UI), a plurality of UI elements associated with a plurality of operators including at least one machine learning (ML) operator and at least one visualization operator, wherein the UI is hosted on a cloud-based platform;
   determining a workflow that describes at least one input data source and an execution order for the at least one ML operator and the at least one visualization operator, wherein the workflow is determined based on: i) a selection of the at least one data source through the UI, ii) a selection of the at least one ML operator and the at least one visualization operator through the UI, iii) an indication, through the UI, of the execution order for the at least one ML operator and the at least one visualization operator, and iv) an indication, from a user and received through the UI, of a destination Uniform Resource Locator (URL), wherein the destination URL identifies a location where at least one prediction can be retrieved after execution of the workflow;
   presenting a visual depiction of the workflow in the UI; and
   executing the determined workflow including executing the at least one ML operator and the at least one visualization operator in the execution order against data included in the at least one data source, wherein the workflow generates the at least one prediction that is presented according to the at least one visualization operator, and wherein the executing the workflow comprises:
      identifying, by the cloud-based platform a computing cluster that comprises the at least one data source; and
      executing the workflow natively on the computer cluster comprising the at least one data source;
   communicating the at least one prediction according to the at least one visualization operator to the destination URL.

2. The method of claim 1, wherein the at least one data source includes at least two heterogeneous data sources.

3. The method of claim 1, wherein the at least one data source includes sensor data generated by at least one internet-of-things (IoT) device.

4. The method of claim 1, wherein the selection of the at least one ML operator and the at least one visualization operator is through a drag-and-drop of the at least one ML operator and the at least one visualization operator from a first section of the UI into a second section of the UI.

5. The method of claim 1, wherein:
   the plurality of operators further include at least one data preparation operator;
   the workflow further describes the at least one data preparation operator;
   the workflow is further determined based on a selection of the at least one data preparation operator through the UI; and
   the execution order further includes the at least one data preparation operator executed prior to the at least one ML operator.

6. The method of claim 1, wherein the at least one prediction is presented according to the at least one visualization operator in the UI.

7. The method of claim 1, wherein the at least one ML operator includes at least one model that generates the at least one prediction based on input data from the at least one input data source.

8. The method of claim 7, further comprising generating a classifier, including:
determining a second workflow that describes the at least one input data source and at least one other ML operator to train the at least one model based on training data from the at least one input data source.

9. The method of claim 8, wherein the second workflow is specified through the UI.

10. A system comprising:
at least one processor; and
a memory communicatively coupled to the at least one processor, the memory storing instructions which, when executed, cause the at least one processor to perform operations comprising:
presenting, in a user interface (UI), a plurality of UI elements associated with a plurality of operators including at least one machine learning (ML) operator and at least one visualization operator, wherein the UI is hosted on a cloud-based platform;
determining a workflow that describes at least one input data source and an execution order for the at least one ML operator and the at least one visualization operator, wherein the workflow is determined based on: i) a selection of the at least one data source through the UI, ii) a selection of the at least one ML operator and the at least one visualization operator through the UI, iii) an indication, through the UI, of the execution order for the at least one ML operator and the at least one visualization operator, and iv) an indication, from a user and received through the UI, of a destination Uniform Resource Locator (URL), wherein the destination URL identifies a location where at least one prediction can be retrieved after execution of the workflow;
presenting a visual depiction of the workflow in the UI; and
executing the determined workflow including executing the at least one ML operator and the at least one visualization operator in the execution order against data included in the at least one data source, wherein the workflow generates at least one prediction that is presented according to the at least one visualization operator, and wherein the executing the workflow comprises:
identifying, by the cloud-based platform a computing cluster that comprises the at least one data source; and
executing the workflow natively on the computer cluster comprising the at least one data source;
communicating the at least one prediction according to the at least one visualization operator to the destination URL.

11. The system of claim 10, wherein the at least one data source includes at least two heterogeneous data sources.

12. The system of claim 10, wherein the at least one data source includes sensor data generated by at least one internet-of-things (IoT) device.

13. The system of claim 10, wherein the selection of the at least one ML operator and the at least one visualization operator is through a drag-and-drop of the at least one ML operator and the at least one visualization operator from a first section of the UI into a second section of the UI.

14. The system of claim 10, wherein:
the plurality of operators further include at least one data preparation operator;
the workflow further describes the at least one data preparation operator;
the workflow is further determined based on a selection of the at least one data preparation operator through the UI; and
the execution order further includes the at least one data preparation operator executed prior to the at least one ML operator.

15. The system of claim 10, wherein the at least one prediction is presented according to the at least one visualization operator in the UI.

16. The system of claim 10, wherein the at least one ML operator includes at least one model that generates the at least one prediction based on input data from the at least one input data source.

17. The system of claim 16, further comprising generating a classifier, including:
determining a second workflow that describes the at least one input data source and at least one other ML operator to train the at least one model based on training data from the at least one input data source, wherein the second workflow is specified through the UI.

18. One or more non-transitory computer-readable storage media storing instructions which, when executed, cause at least one processor to perform operations comprising:
presenting, in a user interface (UI), a plurality of UI elements associated with a plurality of operators including at least one machine learning (ML) operator and at least one visualization operator, wherein the UI is hosted on a cloud-based platform;
determining a workflow that describes at least one input data source and an execution order for the at least one ML operator and the at least one visualization operator, wherein the workflow is determined based on: i) a selection of the at least one data source through the UI, ii) a selection of the at least one ML operator and the at least one visualization operator through the UI, iii) an indication, through the UI, of the execution order for the at least one ML operator and the at least one visualization operator, and iv) an indication, from a user and received through the UI, of a destination Uniform Resource Locator (URL), wherein the destination URL identifies a location where at least one prediction can be retrieved after execution of the workflow;
presenting a visual depiction of the workflow in the UI; and
executing the determined workflow including executing the at least one ML operator and the at least one visualization operator in the execution order against data included in the at least one data source, wherein the workflow generates at least one prediction that is presented according to the at least one visualization operator, and wherein the executing the workflow comprises:
identifying, by the cloud-based platform a computing cluster that comprises the at least one data source; and
executing the workflow natively on the computer cluster comprising the at least one data source;
communicating the at least one prediction according to the at least one visualization operator to the destination URL.

* * * * *